United States Patent [19]

Cwirzen et al.

[11] Patent Number: 4,875,868

[45] Date of Patent: Oct. 24, 1989

[54] ELECTRICALLY PROTECTED CONNECTOR FOR TELEPHONE DISTRIBUTION FRAMES

[75] Inventors: Casimir Z. Cwirzen, Arlington Heights; Albert Kupferschmidt, Highland Park, both of Ill.

[73] Assignee: Northern Telecom Limited, Canada

[21] Appl. No.: 229,124

[22] Filed: Aug. 5, 1988

[51] Int. Cl.$^4$ ............................................. H01R 29/00
[52] U.S. Cl. .................................... 439/188; 439/922; 361/119
[58] Field of Search ............... 439/188, 189, 718, 719, 439/709, 922; 361/118, 119; 200/51.05, 51.06, 51.09, 51.10; 379/327, 328

[56] References Cited

U.S. PATENT DOCUMENTS 3,535,463 10/1970 Trucco ................................. 379/327
4,149,211 4/1979 Dehoff ................................. 361/119

FOREIGN PATENT DOCUMENTS

A70327 4/1959 France ................................. 379/327

Primary Examiner—Neil Abrams
Assistant Examiner—Khiem Nguyen
Attorney, Agent, or Firm—Laff, Whitesel, Conte & Saret

[57] ABSTRACT

A plug-in module may be added to terminals on an existing telephone distribution frame. Electronic modules may be added to the plug-in modules to provide surge and lightning protection and the like. This way a distribution frame built to protect electromechanical voice signal transmission standards may be upgraded to protect electronic transmission data signal transmission capabilities, both now and in the future.

19 Claims, 2 Drawing Sheets

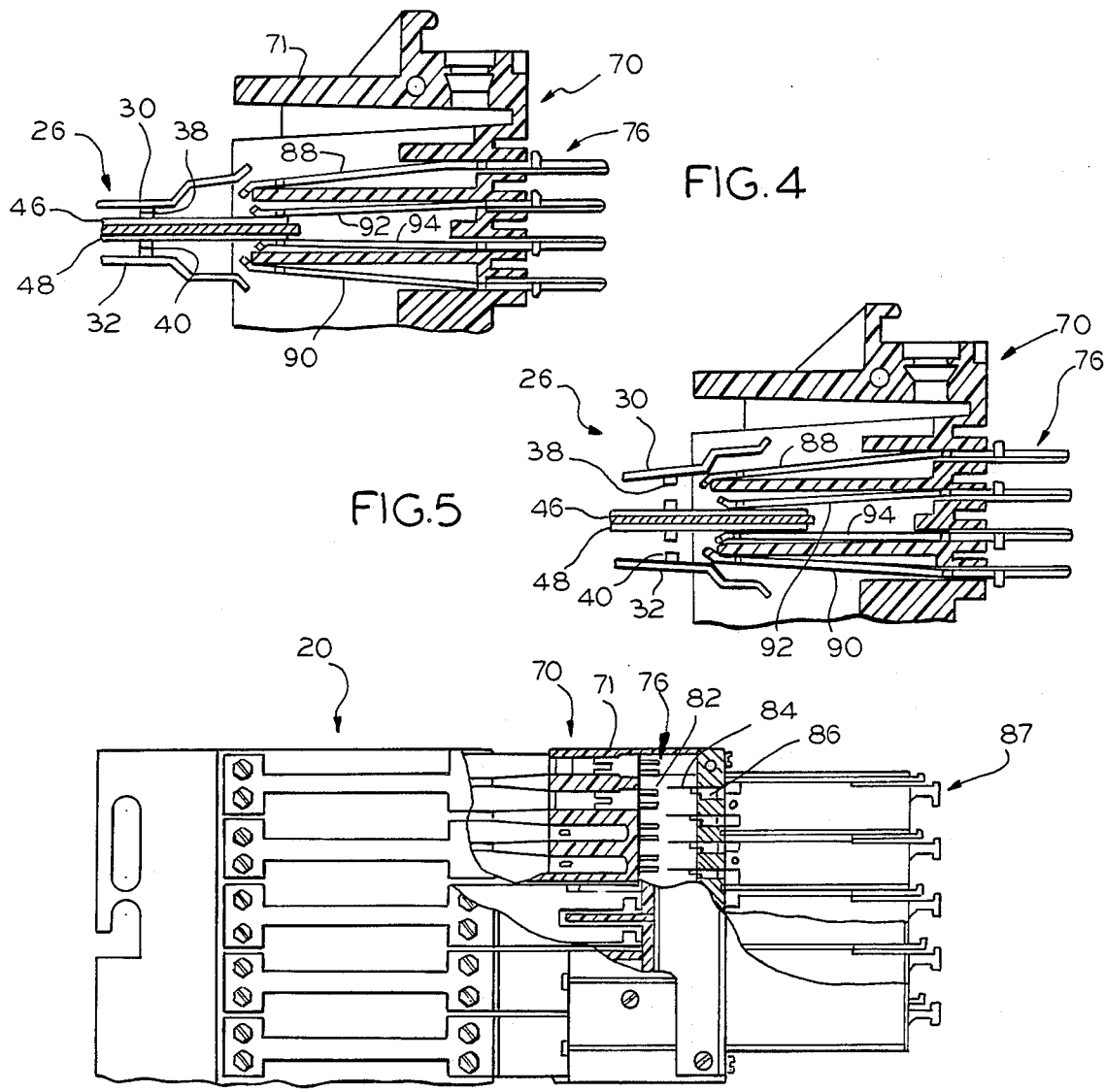
FIG.4
FIG.5
FIG.6
FIG.7
FIG.8
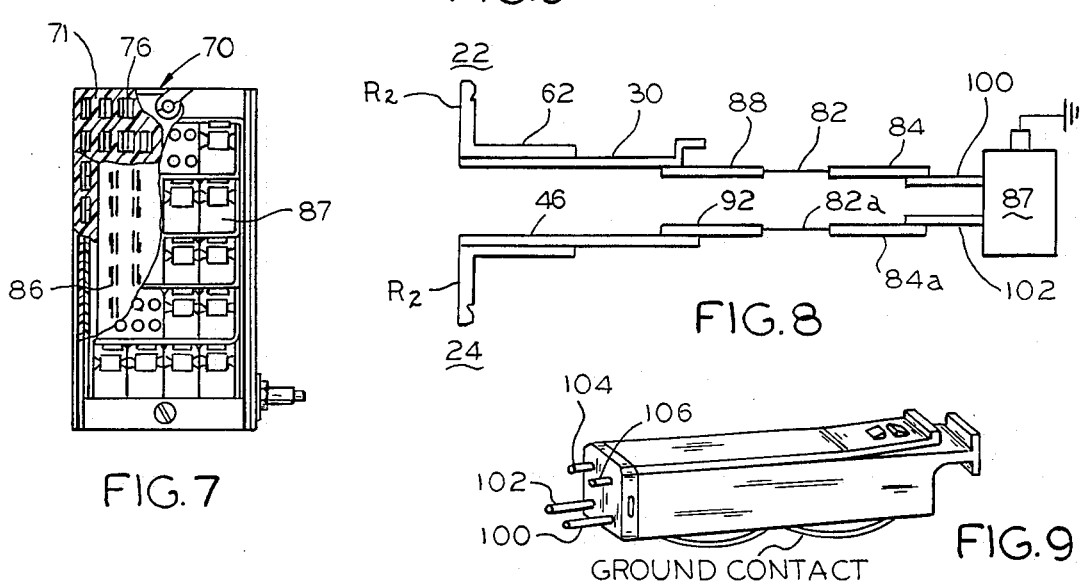
FIG.9
GROUND CONTACT

ELECTRICALLY PROTECTED CONNECTOR FOR TELEPHONE DISTRIBUTION FRAMES

This invention relates to electrical protectors for use on telephone distribution frames, and, more particularly, to protectors for upgrading distribution frame equipment originally designed for use with electromechanical equipment so that it may serve electronic equipment.

A distribution frame is a mechanical structure which provides a field of connector terminals. The terminals are interconnected within the structure so that a wire that is connected to one terminal is electrically joined to another wire that is connected to another terminal. An example of a use for such a distribution frame is at the electrical entrance to a central telephone office. Incoming cables may have hundreds or even thousands of wires which join the central office to subscriber lines or to other central offices. Each of these incoming wires is attached to a terminal on the distribution frame. The corresponding and internally connected terminal on the distribution frame is connected to equipment within the central office which services the needs of the incoming line. This frame provides both identification so that the incoming line may be found quickly and flexibly so that some other central office equipment may be assigned to serve the incoming line, as when needs change, equipment is replaced or repaired, or when service expands.

Usually central office telephone equipment has a lifetime which may be in the order of forty years. Therefore, equipment in current use may have been designed much more than forty years ago. During that period of time the development of telephone equipment has involved many revolutionary advances, one of which is the advent of data transmission under the control of electronic computer-line equipment.

Therefore, there is a problem since many items which still have many years of useful life are obsolete and should be replaced, not because they are worn out, but because the demands upon them are more than they can deliver. An example of such obsolete equipment is a distribution frame, which is little more than rows of terminals onto which wires may be connected. Since a distribution frame does not have parts which experience a substantial amount of wear, it does not normally wear out. Moreover, the extensive amounts of hand labor required to make the millions of connections that would be necessary to replace all existing distribution frames would be extremely expensive.

The equipment connected to such distribution frames has advanced from electromechanical devices for processing calls involving voice signals alone to electronic devices for also processing very high frequency data transmission. Therefore, it has become imperative to provide such things as surge protection, a different form of faster acting lightning protection, and the like. Those who are skilled in the art will readily think of many other examples where electronic data transmission equipment must receive a much higher level of protection as compared to the level of protection given to electromechanical equipment.

As a practical matter, this kind of protection should be located at or near the distribution frames because that is where the uncontrolled environment of outside wiring enters the controlled environment within the central office. However, there is little or no room to add such new types of equipment at this location.

It is necessary to provide means for opening and closing the lines that are joined at a distribution frame in order to test them. It is also necessary to open and close circuits including those lines in the proper order. For example, an incoming line should be first connected through a breakdown device to ground and only then should it be connected to the central office equipment. If there is a high voltage on a faulty line, the breakdown device conducts to ground so that the high voltage is grounded before it can reach and damage the central office equipment.

One existing type of distribution frame includes a device which is known in one of its several forms as a "Type-301 connector" and in another of its forms as a "Type-444C jack". This device, hereinafter called a "Type-301 connector", is designed so that test equipment may be connected to the lines at the distribution frame where the outside line enters the exchange. When the test device including the Type-301 connector is operated in one manner, the outside line is tested, unaffected by anything in the central office. When the test device is operated in another manner the line inside the central office is tested, unaffected by anything on the outside line.

One problem with the Type-301 connector is that each section of the distribution frame has enough terminals to serve the needs of one hundred lines, with successive connector sections abutting one another and with no spare room for add-on surge protectors. Therefore, if an attempt is made to add the surge protectors at this point, they cannot occupy any more space than the Type-301 connector was designed to accommodate. Moreover, the added surge protectors must be easily removed so that the above described line testing may be carried out.

Accordingly, an object of this invention is to provide new and improved protection which upgrades electromechanical devices to serve the needs of electronic equipment. Here, an object is to provide protection for data transmission over lines originally designed to carry only voice signals. In this connection, an object is to upgrade existing equipment at a minimum cost to meet these needs.

Another object of this invention is to provide the described forms of protection in a manner which enables a continued modernization as more stringent requirements come into effect. Here an object is to provide such protection in a manner so that the design may become a standard for new equipment and not just an interim correction to be used pending replacement of the existing equipment.

In keeping with an aspect of the invention, these and other objects are accomplished by providing a connector or adaptor designed to plug into the test contacts on a distribution frame, which contacts are used to open the line for test purposes. The inventive connector provides a number of contacts which are adapted to receive a further module that contains any suitable electronic components. For example, these further modules may provide surge protection or newer forms of lightning protection, or any suitable combination thereof. By the simple expedient of changing the electronic module, almost any new and suitable requirements may also be accommodated in the future. This way, the existing distribution frame hardware may continue to be updated and used for the indefinite future.

A preferred embodiment of the invention is shown in the attached drawings, in which:

FIG. 4 is a stop-motion view which shows the inventive connector being installed so that one set of contacts is closed before another set of contacts is opened;

FIG. 5 is a second stop motion view showing the inventive connector in a second position, with both sets of contacts in their open position;

FIG. 6 is a top plan view (partially in cross section) taken along line 6—6 of FIG. 3;

FIG. 7 is an end elevation view (partially in cross section) taken along line 7—7 of FIG. 3;

FIG. 8 is an exemplary electrical circuit through the distribution frame, inventive module, and further electronic module; and FIG. 9 is a perspective view of the further electronic module.

The prior art distribution frame 20 (FIG. 1) includes upper and lower primary terminals 22, 24 for receiving wires of any suitable kind. For example, the four terminals that are shown could receive two pairs of tip and ring conductors designated T1, R1, T2, R2, respectively. Three upper primary terminals could also receive tip, ring and sleeve of one line and a lower three terminals could receive the tip, ring and sleeve conductors associated with central office equipment. One of these sets of primary terminals could be connected to the incoming line, bringing a connection from the outside into the central office. The other of the sets of primary terminals could be connected to wires which extend through the central office. The internal construction of the distribution frame interconnects the various terminals in a predetermined pattern. While the drawings show solder-type terminals, they may also be wire wrap, or any other suitable terminals.

Figure 1:
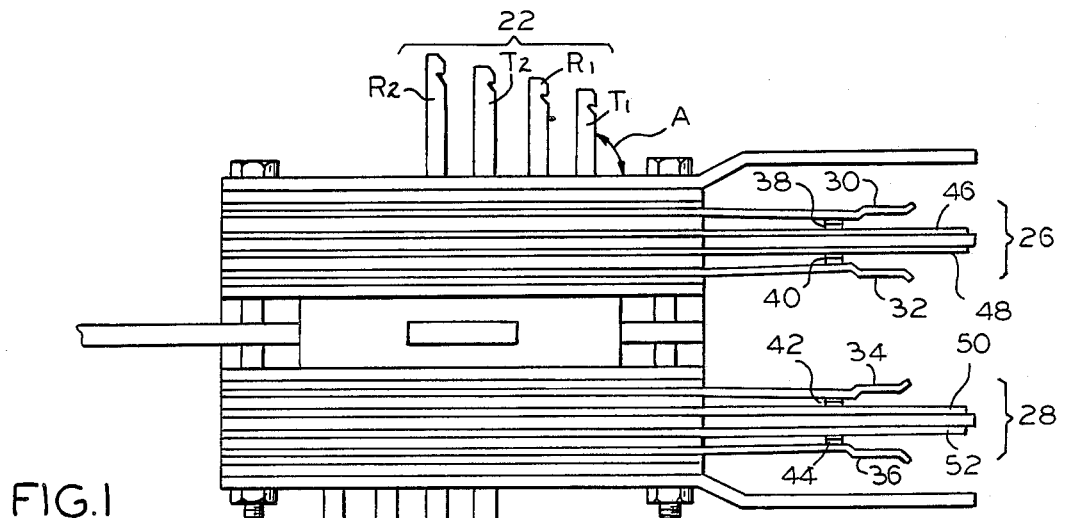
FIG. 1 is an end view of an existing distribution frame having test contacts for separately testing the lines extending into and through the central office.

In addition to the primary terminals 22, 24, the distribution frame of the FIG. 1 frame has secondary or test leaf spring terminals 26, 28 which may be used to open the lines for testing purposes. The secondary terminals 26, 28 project from this frame at right angles (as shown by the angle A) with respect to the orientation of the primary terminals. For example, it might be desirable to use the terminals 26, 28 in order to test the incoming lines connected to terminals 22 while terminating the in-office lines connected to terminals 24, or the other way around. Each of the secondary or test terminals 26, 28 comprise two outside terminals 30-36. Each of the test terminals 26, 28 also include two interior contacts 46-52, which have contacts 38-44 that come together to make a circuit from outside contact springs 38-44 (such as 30) to confronting interior contact springs (such as 46), respectively, for example. The geometry is such that the interior contacts are engaged first to close circuits before the contacts 38-44 open circuits.

Figure 2:
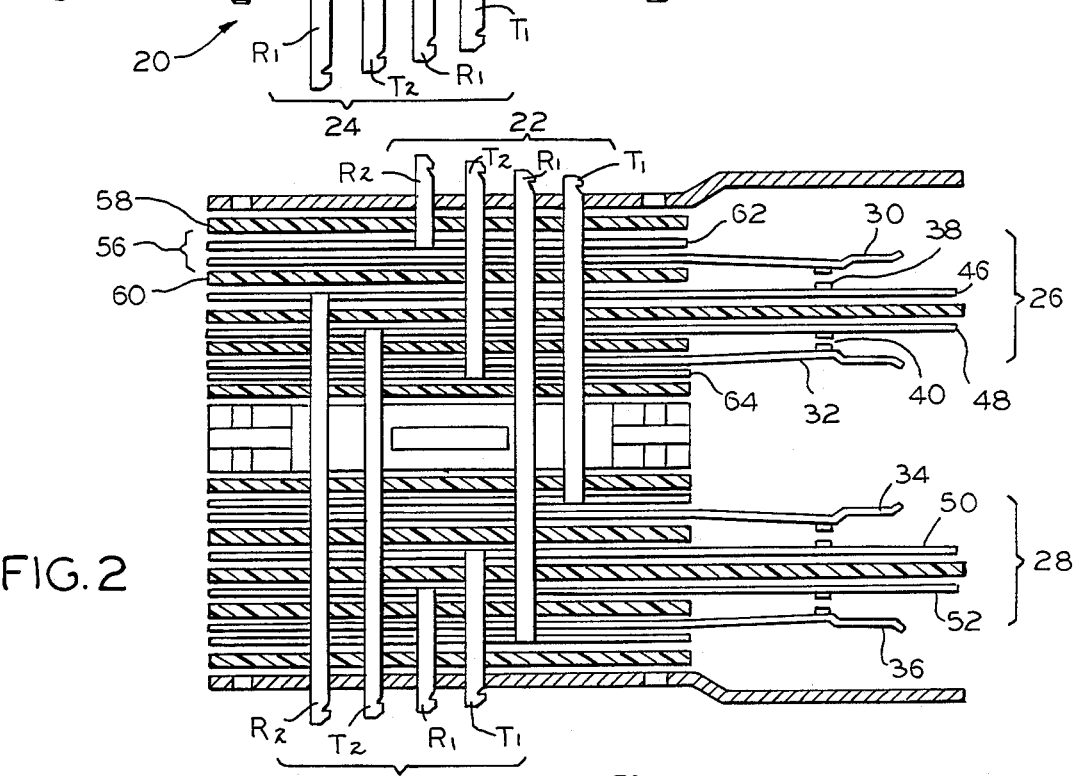
FIG. 2 shows the distribution frame of FIG. 1, in cross section and exploded to reveal its internal construction.

The internal construction of the distribution frame is seen in FIG. 2 where there is an expanded or exploded view of a stack of leaf spring metal contacts (such as 56) and insulator boards (such as 58, 60). The metal contact material is preferably die cut to interconnect selected ones of the terminals. For example, as seen at 56, layers 62, 30 are bolted together in a face-to-face contact to make an electrical connection. The upper terminal R2 is connected to the lower terminal R2 via face-to-face contact layers 62, 30, contacts 38, and confronting leaf spring contact 46. Likewise, upper terminal T2 is connected to lower terminal T2 via face-to-face contact layers 64, 32, contacts 40, and confronting leaf spring contact 48. The interrelationship between the parallel primary terminals 22, 24 and the perpendicular thereto test terminals 26, 28 should also be apparent from an inspection of this figure. It should be noted that the contact layers 30, 46, 48, 32 may be made longer or shorter relative to each other in order to control which contacts make or break first.

Figure 3:
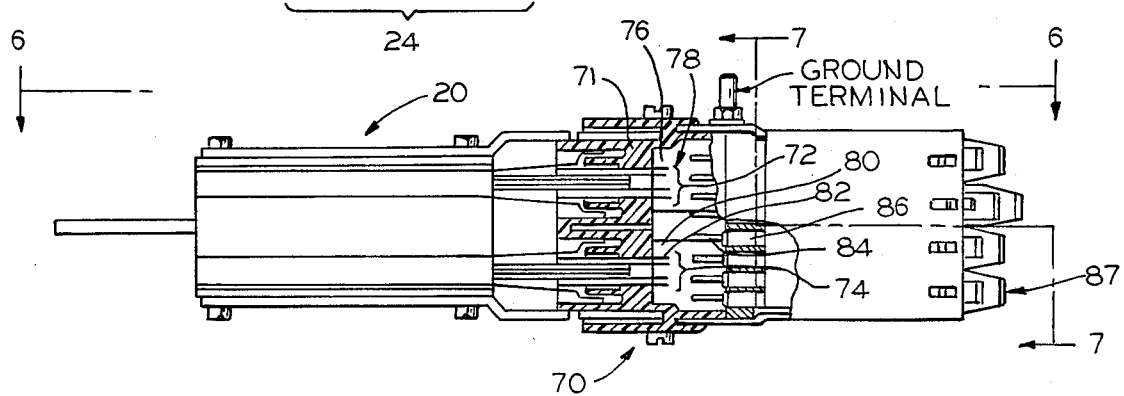
FIG. 3 is a side elevation which shows the distribution frame with the inventive connector in place over the test contacts.

As best seen in FIG. 3, the inventive module 70 is designed to slip over and fit into the test terminals 26, 28 of this Type-301 prior art connector 20. More particularly, the inventive module 70 includes a preferably molded plastic or other insulating piecepart 71 which receives contacts 72, 74 which have preferably been die cut from flat sheets of spring material. These contacts may also have any suitable length so that they may be designed to make before a break in any suitable sequence, which may be the same manner that the prior art test devices operated, for example. By altering the geometry of these springs, different sequences of contact making or breaking may be accommodated.

The opposite ends 76 of these contact springs may be either connected or adapted to receive the contacts of further modules containing any suitable electronic circuits or devices. Thus, for example, one of the further modules may have a surge protector built into it. Another may have an improved lightning protection built into it. Still a third may have both surge protection and lightning protection. In a similar manner, any suitable circuits may be built into these further modules in order to give almost any desired present or future characteristics. A full range of such protectors are available from the Cook division of Northern Telecom, Inc. of 6201 Oakton Street, Morton Grove, Ill. 60053-2722, and are sold under the trade designation "MPC Connector."

At 78 there is a space which may represent either arbitrary cross wiring or pre-determined through connections, as may be required. For present purposes, it may be assumed that all contacts are through-connected, as contact 80 is shown connected at 82 to contact 84. Each of the contacts 76, similar to 80, has an associated receptacle terminal r socket 86 for receiving the further module 87, on a plug-in basis.

Each of the further modules 87 (FIGS. 3, 9) has a tab or handle 89 which may be gripped to pull the module out of the receptacle terminals 86. As shown in FIG. 3, three of the further modules are fully installed. A fourth 87a of these further modules is shown in the process of being pushed into or pulled out of the receptacle terminal 86.

A detent D1 is formed on each of the further modules 87 (FIGS. 3, 9). The inventive module 70 has keeper K1 for receiving a detent D1 on each further module. The further module has a pair of long terminals 100, 102 (FIG. 9) and a pair of short terminals 104, 106. Therefore, when detent D1 is indexed to snap over edge K2 (FIG. 3) of keeper K1, surge or lightning protection is provided to the outside line via the long terminals 100, 102, the short terminals 104, 106 being then disconnected. When detent D1 is indexed in the keeper K1 window, all four terminals 100-106 of the farther module 87 are connected. Then, the electronic protection device is active both inside and outside the exchange.

This way, depending upon the indexing of detent D1, the office is always protected against a lightning strike on the outside line, for example, even when the inside line is open, as for testing purposes.

The internal contacts, within module 70 are shown in the stop-motion views of FIGS. 4, 5. The module 70 contains leaf spring contacts 88-94. The outer contacts 88, 90 make a connection with outer secondary contacts 30, 32 on the distribution frame. The inner contacts 92, 94 make a connection with the inner contacts 46, 48. As shown in the stop motion view FIG. 4, the inner contacts 92, 94 in module 70 have made contact with the leaf spring contacts 46, 48 as the inventive module is being installed on the distribution frame. At this time, the contact 30, 32 have not yet made contact with the module contacts 88, 90. Therefore, leaf spring contacts 30, 46 are still connected via closed contacts 38. Likewise, leaf spring contacts 32, 48 are still connected via closed contacts 40. Thus, there is a make-before-break contact combination.

In stop motion view FIG. 5, the module 70 is shown in a second position as it is being installed over the test terminals 26. At this point, outer leaf spring contacts 30, 32 have flexed and been deflected to open contacts 38, 40 and thereby disconnect outer leaf spring contacts 30, 32 from inner leaf spring contacts 46, 48, respectively. Thus, there is a circuit break after the contacts 46, 92 and 48, 94 have made.

The reason for the make-before-break sequence is irrelevant. The point is that by varying the relative lengths of the various contacts, almost any combination of make-break sequences may be provided. For example, FIG. 4 shows the initial contact with the incoming (outside of plant) lines. Upon module insertion, a connection to ground is first established through a breakdown device and then a circuit to the central office is thereafter established so that a faulty incoming line will cause the breakdown device to conduct to ground in order to absorb any dangerous condition and short a high voltage to ground.

FIGS. 6, 7 show how the further electronic modules may be added to the module 70. More particularly, the contacts 76 on the module 70 are connected to terminals 84 (FIG. 3) in receptacles or sockets 86. Each of the further electronic modules 87 plugs into an associated one or ones of the sockets 86. Therefor, surge protection, for example, may be built into the module 87 which is connected to the line via module 70. If the surge protector is to be replaced, it is only necessary to pull one of the modules 87 from socket 86 and to replace it with a new one.

The circuit to this surge module is shown in FIG. 8 where the various reference numbers identify the same parts which are identified in other figures by the same reference numerals. This circuit of FIG. 8 may be traced from contacts 22 (FIG. 2) terminal R2, for example, through conductive layer 62, leaf spring contact 30, contact 88, interconnection 82, contacts 84 in socket 86 (FIG. 7), terminal 100, module 87, terminal 102, contact 84a in socket 86, interconnection 82a, contact 92, leaf spring contact 46, and contacts 24 (FIG. 2) terminal R2. Similar circuits may be traced through FIG. 2 for each of the other terminals on the distribution frame.

The advantages of the invention should now be clear. Existing distribution frames which were originally designed for electromechanical equipment may be upgraded to serve electronic equipment without requiring replacement. Any suitable sequence of make/break circuit connections may be accommodated. The surge protector may be designed to fit any needs and may be replaced with other protectors when the needs change.

Those who are skilled in the art will readily perceive how to modify the invention. Therefore, the appended claims should be construed to cover all equivalent structures.

What is claimed is:

1. A protection system for a telephone distribution frame for interconnecting inside and outside lines and having at least one set of contacts individually associated with each line connected thereto, said system comprising an interface module means which may be connected to said set of contacts, said module including contacts with a geometry which is selected to complete a desired make/break sequence of circuit connections when said module is plugged into or removed from said set of contacts, means on said module for receiving a further module containing electronic circuitry protecting equipment, means within said distribution frame for connecting said further module to said line, and means within said module for continuously applying ground to outside lines while enabling an isolation of inside lines from said outside lines.

2. The system of claim 1 wherein said protecting equipment is a surge protection means.

3. The system of claim 1 wherein said protection equipment is lightning protection means.

4. The system of claim 1 wherein said protection equipment is data transmission protection equipment.

5. The system of claim 1 wherein said further module either comprises means for selectively connecting said further module either to one line or to two lines.

6. The system of claim 1 wherein said module has an operate position for operational interconnection of said inside and outside lines and a detente position for providing said isolation.

7. An add-on protector for a distribution frame in a telephone system, said distribution frame comprising a plurality of sets of primary terminals for making connections with various wires and a plurality of sets of secondary terminals for testing said wires, means in said distribution frame for internally interconnecting said terminals in a predetermined pattern for forming said primary terminals into pairs and for individually associating said secondary terminals with said pair of said primary terminals, said add-on protector comprising module means for making connections into said secondary terminals and from these through said predetermined pattern to said individually associated pair of primary terminals, and electronic protection means associated with said module means for providing a data transmission grade of protection to outside lines while isolating inside lines for installation, maintenance, and repair.

8. The add-on protector of claim 7 wherein said distribution frame comprises a plurality of layers of conductive and insulation materials, said conductive layers being cut and folded to provide said terminals whereby said pattern is formed by superimposing said conductive layers, said primary terminals projecting from said distribution frame as upper and lower pairs and said secondary terminals project at right angles thereto from a point between said upper and lower primary terminals, and said add-on module means comprises a plurality of terminals which plug into said projecting secondary terminals and means for applying an independent ground.

9. The add-on protector of claim 7 wherein said projecting secondary terminals comprises a pair of outer leaf spring terminals with its closest confronting pair of inner leaf spring terminals therebetween, least one contact between each of said outer leaf spring contacts and its closest confronting one of said inner leaf spring contacts, whereby said at least one contact interconnects said outer and closest confronting inner leaf springs until said leaf springs are flexed to open said at least one contact, and means responsive at least in part to geometrically selected dimensions for other leaf springs in said add-on module means for closing one selected circuit before opening at least one other selected circuit via said secondary contacts.

10. The add-on protector of claim 9 wherein said other leaf springs selectively interleave with said outer and inner leaf springs of said secondary terminals for causing and flexing.

11. The add-on protector of claim 10 wherein said module comprises an insulating part having said other leaf springs embedded in one side thereof and a receptacle formed in another side thereof, and said electronic protection means is plugged into said receptacle.

12. The system of claim 7 wherein said module has an operate position for operational interconnection of said inside and outside lines and a detente position for providing said isolation.

13. An add-on protector for a distribution frame in a telephone system, said distribution frame comprising a plurality of sets of primary terminals for making connections with various wires and a plurality of sets of secondary terminals for testing said wires, means in said distribution frame for internally interconnecting said terminals in a predetermined pattern for forming said primary terminals into pairs and for individually associating said secondary terminals with said pairs of said primary terminals, said add-on protector comprising module means for making connections into said secondary terminals and from these through said predetermined pattern to said individually associated pair of primary terminals, electronic protections means associated with said module means for providing a data transmission grade of protection, said electronic protection means comprises a module having terminals with different lengths, and means for indexing the position of the electronic protection means relative to said module means according to the lengths of said terminals, whereby said further module is selectively coupled to different circuits depending upon its indexed position.

14. The add-on protector of claim 13 wherein said electronic protection means further comprises a surge protection means.

15. The add-on protector of claim 13 wherein said electronic protection means further comprises a lightning protector.

16. A distribution frame originally having electromechanical capability for protecting the transmission of both voice and data signals through said frame at electromechanical speeds, said frame not originally having capabilities for protecting the transmission of data signals through said frame at electronic speeds, protection means for protecting the electronic speed data signals transmission capabilities, interface means for attaching said protection means to existing terminals on said frame for imparting said electronic speed data signal transmission protection means to existing terminals on said frame for imparting said electronic speed data signal transmission protection capabilities to said frame thereby upgrading said frame without having to rebuild it in order to provide protection for both said electromechanical and electronic speed voice and said data signal data transmission capabilities, and terminals on said interface protection means for receiving plug-in connections of specialized circuits, whereby said distribution frame may be further modified in the future.

17. The distribution frame of claim 16 wherein said distribution frame comprises a Type-301 connector having test terminals and said protection means has a geometry which plugs into said test terminals.

18. The distribution frame of claim 17 wherein said geometry causes selected circuits to close before other circuits open.

19. THe distribution frame of claim 18 wherein said interface protection means has plug-in connectors for mating with said existing terminals on said frame, said plug-in connectors enabling said interface protection means to be moved to either of two positions in order to selectively engaged and open or close circuits in different combinations in response to placing said plug-in connectors in either of two positions.

* * * * *